United States Patent
Jeong et al.

(10) Patent No.: US 8,526,526 B2
(45) Date of Patent: Sep. 3, 2013

(54) APPARATUS FOR TRANSMISSION AND RECEPTION WITH TRANSMIT DIVERSITY USING CYCLIC SUBCARRIER SHIFT

(75) Inventors: Byung Jang Jeong, Daejeon (KR); Taegyun Noh, Daejeon (KR); Young Jo Ko, Daejeon (KR); Jae Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 317 days.

(21) Appl. No.: 12/999,225

(22) PCT Filed: Jul. 1, 2009

(86) PCT No.: PCT/KR2009/003594
§ 371 (c)(1),
(2), (4) Date: Dec. 15, 2010

(87) PCT Pub. No.: WO2010/002192
PCT Pub. Date: Jan. 7, 2010

(65) Prior Publication Data
US 2011/0090987 A1    Apr. 21, 2011

(30) Foreign Application Priority Data

Jul. 2, 2008 (KR) .................. 10-2008-0064007
Jun. 26, 2009 (KR) .................. 10-2009-0057692

(51) Int. Cl.
*H04L 1/02* (2006.01)
(52) U.S. Cl.
USPC .......................................... 375/267
(58) Field of Classification Search
USPC .................. 375/260, 261, 267, 298, 299, 347
See application file for complete search history.

(56) References Cited

U.S. PATENT DOCUMENTS

| | | | |
|---|---|---|---|
| 7,668,248 B2* | 2/2010 | Hocevar | 375/260 |
| 8,223,627 B2* | 7/2012 | Laroia et al. | 370/208 |
| 2008/0075191 A1* | 3/2008 | Haartsen | 375/285 |
| 2008/0310484 A1* | 12/2008 | Shattil | 375/146 |
| 2011/0075651 A1* | 3/2011 | Jia et al. | 370/344 |

* cited by examiner

*Primary Examiner* — Don N Vo
(74) *Attorney, Agent, or Firm* — Nelson Mullins Riley & Scarborough LLP

(57) ABSTRACT

Provided is a technology adopting multiple transmit antennas in a radio communication system. In a mobile communication system of a signal carrier frequency division multiple access (SC-FDMA) scheme, it is possible to transmit data using the multiple transmit antennas, while maintaining a peak to average power ratio (PAPR) to be low. Also, it is possible to provide a new transmit diversity transmission even in a general radio communication system including an orthogonal frequency division multiple access (OFDMA), a code division multiple access (CDMA) scheme, and the like.

15 Claims, 5 Drawing Sheets

APPARATUS FOR TRANSMISSION AND RECEPTION WITH TRANSMIT DIVERSITY USING CYCLIC SUBCARRIER SHIFT

RELATED APPLICATIONS

This application is a 35 U.S.C. §371 national stage filing of PCT Application No. PCT/KR2009/003594 filed on Jul. 1, 2009, which claims priority to, and the benefit of, Korean Patent Application No. 10-2008-0064007 filed on Jul. 2, 2008, and Korean Patent Application No. 10-2009-0057692 filed on Jun. 26, 2009. The contents of the aforementioned applications are hereby incorporated by reference.

TECHNICAL FIELD

The present invention relates to a diversity transmission technology using multiple transmit antennas in radio communication systems.

BACKGROUND ART

Currently, an orthogonal frequency division multiple access (OFDMA) scheme is being applied as a basic transmission scheme for most mobile communication systems. The OFDMA scheme may have a high peak to average power ratio (PAPR), which may be a result of a plurality of symbols being a complex number modulating/multiplexing a plurality of subcarriers in the OFDMA scheme.

In order to overcome the above shortcoming, a single carrier frequency division multiple access (SC-FDMA) scheme may spread modulated symbol being a complex number using a discrete Fourier transform (DFT), and after that transmit spread symbols using a ordinary OFDMA scheme.

A transmit antenna diversity transmission scheme may enhance a performance by transmitting a symbol using multiple antennas on a transmission side. The transmit antenna diversity scheme is being widely adopted in radio communication systems using the OFDMA scheme, a code division multiple access (CDMA) scheme, and the like.

DISCLOSURE OF INVENTION

Technical Problem

An aspect of the present invention provides a transmit diversity that may maintain a low peak to average power ratio (PAPR) while transmitting data using multiple antennas in a mobile communication system adopting a single carrier frequency domain multiple access (SC-FDMA) scheme.

Another aspect of the present invention also provides a new transmit diversity that may transmit a modulated symbol via a different frequency domain for each transmit antenna, when transmitting data using multiple antennas in a radio communication system.

Technical Solution

According to an aspect of the present invention, there is provided a transmission apparatus including: a discrete Fourier transform (DFT) spreader to perform a DFT for a modulated symbol to generate frequency domain symbols; a resource mapper to map the frequency domain symbols and a plurality of frequency domain streams; a cyclic shift unit to perform a cyclic shift for each of the frequency domain streams according to a cyclic shift value that is determined with respect to each of the frequency domain streams; and a transmitter to perform an inverse DFT (IDFT) for the cyclic shifted frequency domain streams to generate a plurality of time domain streams, and to transmit the time domain streams to a reception apparatus using a transmit antenna corresponding to each of the time domain streams.

According to another aspect of the present invention, there is provided a transmission apparatus including: a DFT spreader to perform a DFT for a modulated symbol to generate frequency domain symbols; a resource mapper to map the frequency domain symbols and a plurality of frequency domain streams; an IDFT despreader to perform an IDFT for the frequency domain streams to generate a plurality of time domain streams; a phase shift unit to perform a phase shift for each of the time domain streams according to a phase shift value that is determined with respect to each of the time domain streams; and a transmitter to transmit the phase-shifted time domain stream to a reception apparatus using a transmit antenna corresponding to each of the time domain streams.

Advantageous Effects

According to embodiments of the present invention, in a mobile communication system adopting an SC-FDMA scheme, it is possible to transmit data in a form of providing a transmit diversity using multiple antennas while maintaining a low peak to average power ratio (PAPR).

Also, according to embodiments of the present invention, it is possible to provide a new type of a transmit diversity even in a general radio communication system.

MODE FOR THE INVENTION

Figure 1:
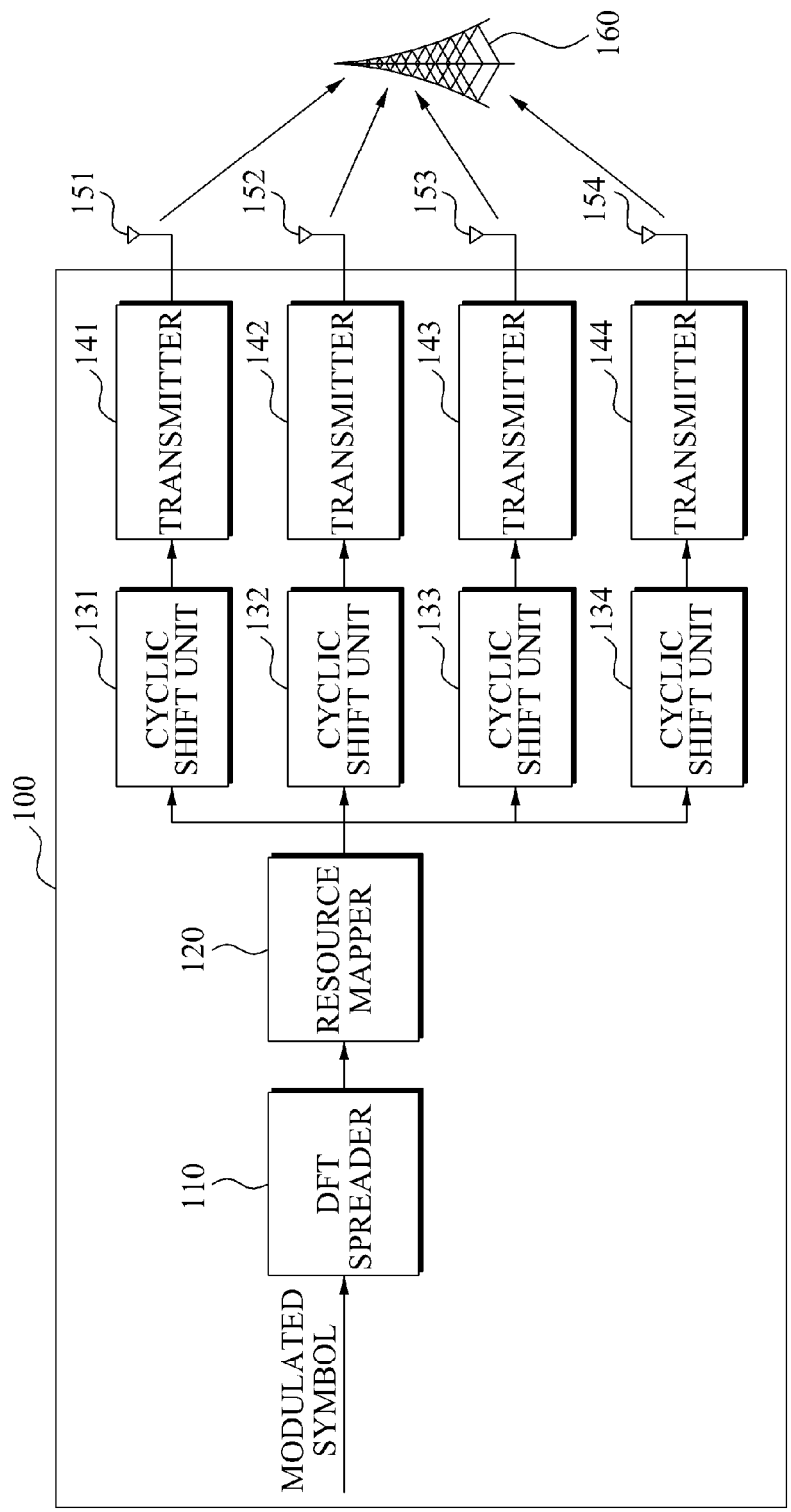
FIG. 1 is a block diagram illustrating a structure of a transmission apparatus to perform a cyclic shift for data in a frequency domain according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram illustrating a structure of a transmission apparatus 100 to perform a cyclic shift for data in a frequency domain according to an embodiment of the present invention. The transmission apparatus 100 may include a discrete Fourier transform (DFT) spreader 110, a resource mapper 120, a plurality of cyclic shift units 131, 132, 133, and 134, and a plurality of transmitters 141, 142, 143, and 144.

The DFT spreader 110 may receive a predetermined number of symbols being a complex number to perform a DFT for the received symbols being a complex number to generate frequency domain symbols. The number of symbols input into the DFT spreader 110 may be determined based on a transform size of the DFT spreader 110.

The resource mapper 120 may map the frequency domain symbols and a plurality of frequency domain streams. For example, the plurality of frequency domain streams may be allocated to different frequency bands. Also, the plurality of frequency domain streams may be allocated to a single frequency band.

The cyclic shift units 131, 132, 133, and 134 may perform a cyclic shift for each of the frequency domain streams according to a cyclic shift value that is determined with respect to each of the frequency domain streams. The cyclic shift units 131, 132, 133, and 134 may determine the cyclic shift value with respect to each of the frequency domain streams. For example, the cyclic shift units 131, 132, 133, and 134 may determine the cyclic shift value to be different with respect to each of the frequency domain streams.

The cyclic shift units 131, 132, 133, and 134 may determine the cyclic shift value based on a number of transmit antennas 151, 152, 153, and 154 of the transmission apparatus 100, and a transform size of the DFT spreader 110. For example, the cyclic shift units 131, 132, 133, and 134 may determine, as the cyclic shift value, an integer fold increase of a value that is obtained by dividing the transform size of the DFT spreader 110 by the number of transmit antennas 151, 152, 153, and 154 or a number of subcarriers.

Referring to FIG. 1, the cyclic shift unit 131 may determine, as the cyclic shift value, a "zero" fold increase of the value that is obtained by dividing the transform size of the DFT spreader 110 by the number of transmit antennas 151, 152, 153, and 154, that is, "4". The cyclic shift unit 132 may determine, as the cyclic shift value, a "one" fold increase of the value that is obtained by dividing the transform size of the DFT spreader 110 by "4". The cyclic shift unit 133 may determine, as the cyclic shift value, a "two" fold increase of the value that is obtained by dividing the transform size of the DFT spreader 110 by "4". The cyclic shift unit 134 may determine, as the cyclic shift value, a "three" fold increase of the value that is obtained by dividing the transform size of the DFT spreader 110 by "4".

The transmitters 141, 142, 143, and 144 may perform an IDFT for the cyclic shifted frequency domain streams to generate a plurality of time domain streams. The transmitters 141, 142, 143, and 144 may transmit the time domain streams to a reception apparatus 160 using a transmit antenna 151, 152, 153, or 154 corresponding to each of the time domain streams. An operation of the transmitters 141, 142, 143, and 144 will be described in detail later with reference to FIG. 3.

Figure 2:
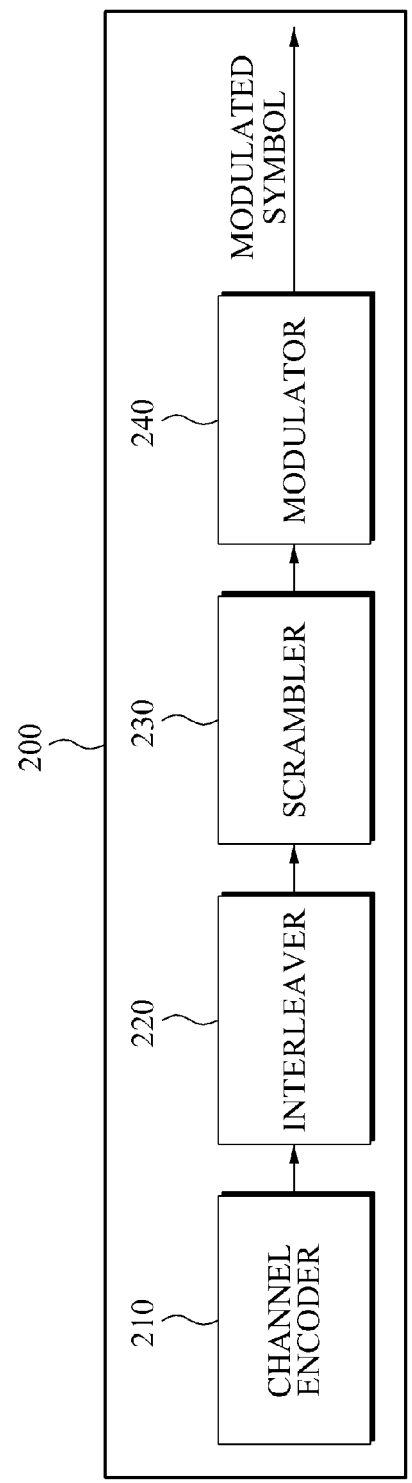
FIG. 2 is a block diagram illustrating a partial structure of a transmission apparatus to generate a modulated symbol according to an embodiment of the present invention.

FIG. 2 is a block diagram illustrating a partial structure of a transmission apparatus 200 to generate a modulated symbol according to an embodiment of the present invention. The transmission apparatus 200 may include a channel encoder 210, an interleaver 220, a scrambler 230, and a modulator 240.

The channel encoder 210 may perform a channel coding for data. The channel encoder 210 may perform the channel coding for the data using a convolutional coding scheme, a turbo coding scheme, or a low density parity check (LDPC) coding scheme.

The interleaver 220 may perform interleaving for the channel coded data. The interleaver 220 may randomly rearrange a sequence of the channel coded data to thereby recover from a burst error occurring in a radio channel.

The scrambler 230 may perform an exclusive operation for the interleaved data and a scrambling sequence to generate scrambled data.

The modulator 240 may modulate the scrambled data to generate a modulated symbol. For example, the modulator 240 may modulate the scrambled data using a phase shift keying (PSK) scheme or a quadratic amplitude modulation (QAM) scheme. The modulated symbol may be input into the DFT spreader 110 of FIG. 1.

Figure 3:
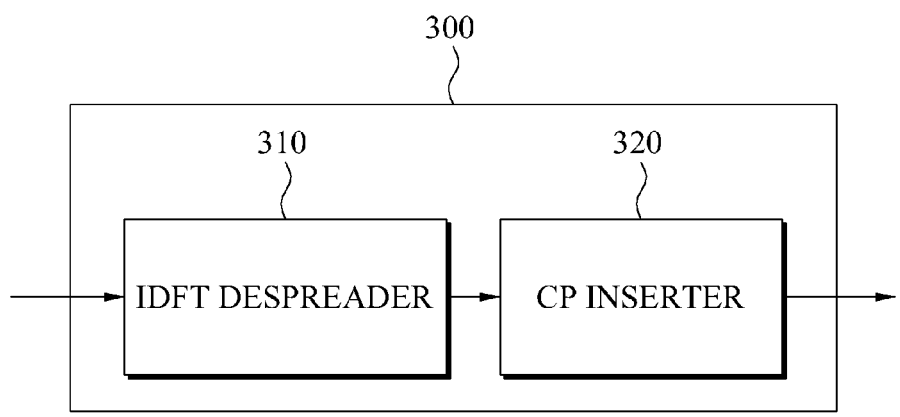
FIG. 3 is a block diagram illustrating a structure of a transmitter according to an embodiment of the present invention.

FIG. 3 is a block diagram illustrating a structure of a transmitter 300 according to an embodiment of the present invention. The transmitter 300 may include an IDFT despreader 310 and a cyclic prefix (CP) inserter 320.

The IDFT despreader 310 may perform an IDFT for cyclic shifted frequency domain streams to generate time domain streams. The generated time domain streams may be transmission signals of a single carrier frequency division multiple access (SC-FDMA) scheme.

When the cyclic shift units 131, 132, 133, and 134 performs the IDFT for the cyclic shifted frequency domain streams according to a different cyclic shift value, a peak to average power ratio (PARP) of the time domain streams generated by the IDFT despreader 310 may be similar to a PARP of modulated symbols that are input into the DFT spreader 110. Specifically, according to an embodiment of the present invention, when generating the transmission signals using the SC-FDMA scheme, it is possible to maintain a low PARP of the transmission signals to be transmitted using a plurality of transmit antennas.

The CP inserter 320 may insert a CP signal into each of the time domain streams.

Here, it is assumed that a transmission of a pilot signal or a reference signal for a channel estimation, a channel estimation of a reception side, and the like is performed using a separate general scheme.

Embodiments of performing a phase shift for data, transmitted via each transmit antenna, in a frequency domain have been described above with reference to FIGS. 1 through 3. When considering a principle of a Fourier transform, a cyclic shift in the frequency domain may correspond to a phase shift in a time domain. Hereinafter, an embodiment of performing the phase shift in the time domain to maintain a low PARP of a transmission signal of an SC-FDMA scheme will be described.

Figure 4:
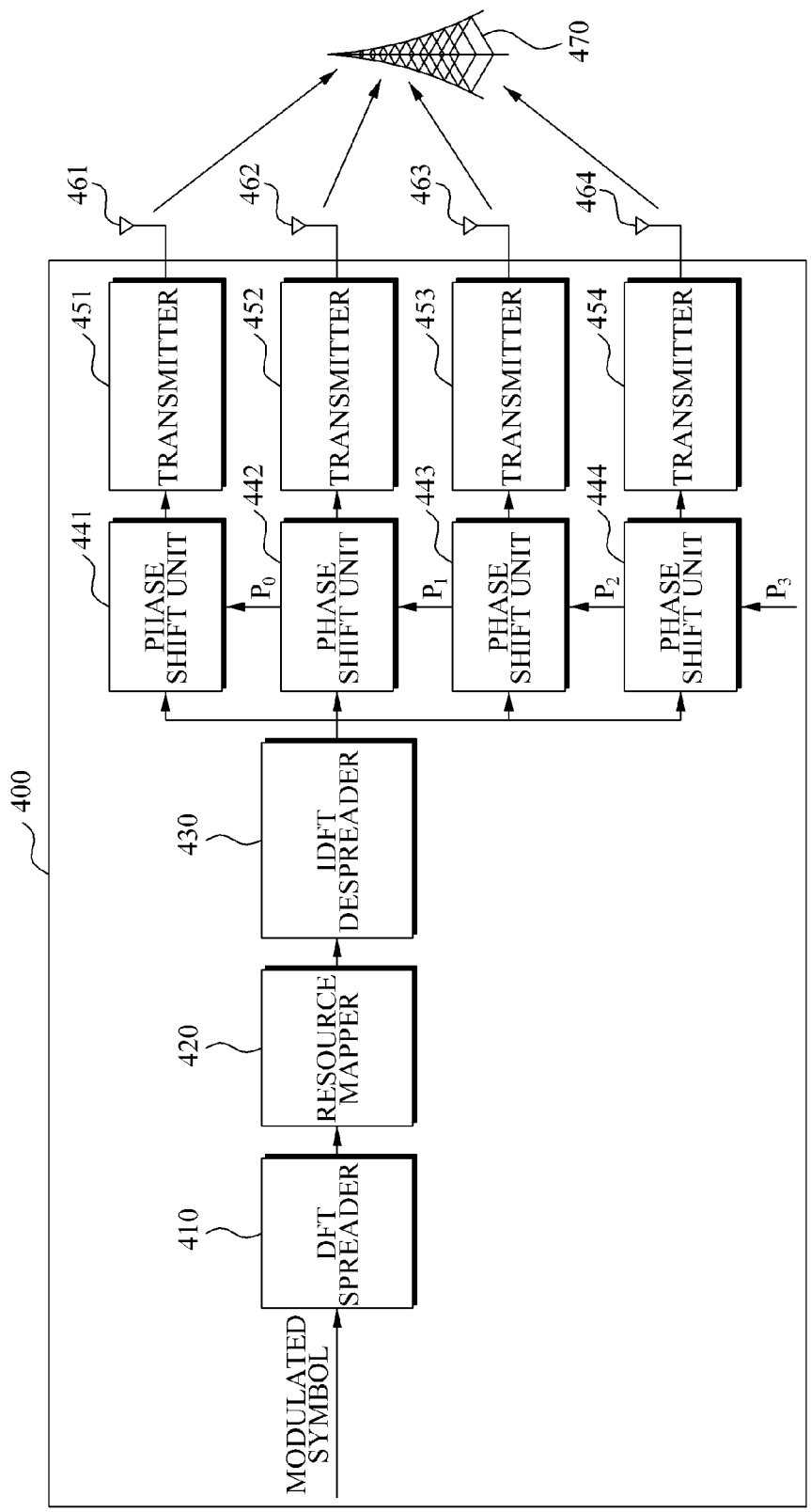
FIG. 4 is a block diagram illustrating a structure of a transmission apparatus to perform a phase shift for data in a time domain according to an embodiment of the present invention.

FIG. 4 is a block diagram illustrating a structure of a transmission apparatus 400 to perform a phase shift for data in a time domain according to an embodiment of the present invention.

A DFT spreader 410 may perform a DFT for a modulated symbol to generate frequency domain symbols. According to an embodiment of the present invention, the DFT spreader 410 may perform the DFT for the modulated symbol using the channel encoder 210, the interleaver 220, the scrambler 230, and the modulator 240 of FIG. 2.

A resource mapper 420 may map the frequency domain symbols and a plurality of frequency domain streams. For example, the plurality of frequency domain streams may be allocated to different frequency bands. Also, the plurality of frequency domain streams may be allocated to a single frequency band.

An IDFT despreader 430 may perform an IDFT for the frequency domain streams to generate time domain streams corresponding to the frequency domain streams. Each of the time domain stream may be an SC-FDMA signal that is transmitted via each of multiple transmit antennas 461, 462, 463, and 464.

Phase shift units 441, 442, 443, and 444 may perform a phase shift for each of the time domain streams according to a phase shift value that is determined with respect to each of the time domain streams. According to an embodiment of the present invention, phase shift values with respect to the time domain streams may be different from each other.

The phase shift units 441, 442, 443, and 444 may determine a phase shift value. For example, the phase shift units 441, 442, 443, and 444 may determine a phase shift value according to each of the time domain streams, based on a number of transmit antennas 461, 462, 463, and 464 of the transmission apparatus 400. For example, the phase shift units 441, 442, 443, and 444 may determine, as the phase shift value with respect to each of the time domain streams, an integer fold increase of an inverse number of the number of transmit antennas 461, 462, 463, and 464.

Referring to FIG. 4, the phase shift unit 441 may determine, as the phase shift value, a "zero" fold increase of the inverse of the number of transmit antennas 461, 462, 463, and 464, that is, "4". The phase shift unit 442 may determine, as the phase shift value, a "one" fold increase of the inverse of "4". The phase shift unit 443 may determine, as the phase shift value, a "two" fold increase of the inverse of "4". The phase shift unit 444 may determine, as the phase shift value, a "three" fold increase of the inverse of "4". It may be given by the following Equation 1:

$$p_m(n) = e^{-j2\pi nm/M}, 0 \leq m \leq M-1, 0 \leq n \leq N-1 \quad \text{[Equation 1]}$$

where $P_m^{(n)}$ denotes an $n^{th}$ value of a phase shift values for an $m^{th}$ phase shift unit, M denotes a number of transmit antennas, and N denotes a transform size of the IDFT despreader 430. The phase shift value may be multiplied with an output signal string of the IDFT despreader 430 for each symbol to thereby generate a phase shifted output signal of each symbol-wise product.

The time domain streams transmitted via the transmit antennas 461, 462, 463, and 464 may be phase shifted according to a different phase shift value. Transmitters 451, 452, 453, and 454 may transmit the time domain streams to a reception apparatus 470 via the transmit antenna 461, 462, 463, or 464 corresponding to each of the time domain streams.

The transmitters 451, 452, 453, and 454 may insert a CP signal into each of the time domain streams, and transmit the time domain streams with the inserted CP to the reception apparatus 470.

Here, it is assumed that a transmission of a pilot signal or a reference signal for a channel estimation, a channel estimation and a synchronization of a reception side, and the like is performed using a separate general scheme.

Figure 5:
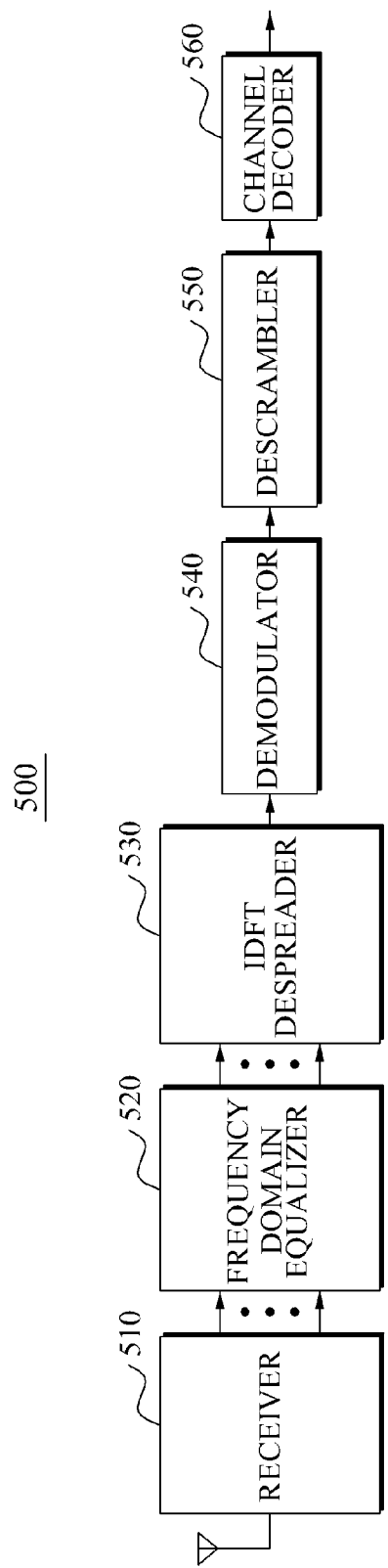
FIG. 5 is a block diagram illustrating a structure of a reception apparatus to detect a signal in a reception end according to an embodiment of the present invention.

FIG. 5 is a block diagram illustrating a structure of a reception apparatus 500 according to an embodiment of the present invention. Although a single receive antenna is shown in FIG. 5, the present invention may be applicable to a plurality of receive antennas as is.

A receiver 510 may receive, from a transmission apparatus (not shown), a plurality of time domain streams that are cyclic shifted according to different cyclic shift values. Each of the time domain streams may be transmitted via a radio channel formed from the transmission apparatus to the reception apparatus 500. The receiver 510 may remove a CP in each of the time domain streams, and perform a DFT for the time domain streams in which the CP is removed. The receiver 510 may perform a DFT for the time domain streams to generate frequency domain streams.

According to an embodiment of the present invention, it is possible to transmit time domain streams using a plurality of transmit antennas. In this case, a difference between cyclic shift values of the time domain streams may be in inverse proportion to the number of transmit antennas.

According to an embodiment of the present invention, the receiver may receive time domain streams using the same number of subcarriers as a number of transmit antennas of a transmission apparatus.

A frequency domain equalizer 520 may equalize the frequency domain streams using channel information that is estimated for a channel estimation process. Specifically, the frequency domain equalizer 520 may perform an IDFT for an equalized frequency domain stream to generate a time domain symbol.

An IDFT despreader 530 may perform an inverse operation of a spread process by the DFT spreader 110 or 410. In a radio communication system adopting an OFDMA scheme instead of an SC-FDMA scheme, when passing the DFT spreader 110 or 410 and the IDFT despreader 530 as is, the present invention may be applicable as is.

According to an embodiment of the present invention, a difference between cyclic shift values of time domain streams may be in proportion to a transform size of the IDFT despreader 530.

A demodulator 540 may demodulate a time domain symbol. According to an embodiment of the present invention, the demodulator may detect a de-spread signal using a symbol, being a complex number, of QPSK, 16QAM, 64QAM, and the like, and may transform the detected signal based on a bit unit. In this instance, the demodulator 540 may receive a soft input and generate a soft output according to a receiver type.

A descrambler 550 may descramble the demodulated time domain symbol.

A channel decoder 560 may perform a channel decoding for the descrambled time domain symbol.

According to an embodiment of the present invention, the frequency domain equalizer 520 may be constructed as follows. Modulated frequency domain symbols may be transmitted by a plurality of subcarriers via a plurality of transmit antennas of a transmission side. Therefore, a reception end may need to perform a frequency domain equalization with respect to the plurality of subcarriers. When the number of transmit antennas of the transmission apparatus is two, the number of receive antennas of the reception apparatus is one, and the transmission apparatus transmits a time domain stream using K subcarriers, a frequency domain stream after the reception apparatus performs a DFT for the time domain stream may be expressed by the following Equation 2:

$$\begin{bmatrix} Y_0 \\ \vdots \\ Y_{K/2-1} \\ Y_{K/2} \\ \vdots \\ Y_{K-1} \end{bmatrix} = \begin{bmatrix} H_0^0 X_0 \\ \vdots \\ H_{K/2-1}^0 X_{K/2-1} \\ H_{K/2}^0 X_{K/2} \\ \vdots \\ H_{K-1}^0 X_{K-1} \end{bmatrix} + \begin{bmatrix} H_0^1 X_{K/2} \\ \vdots \\ H_{K/2-1}^1 X_{K-1} \\ H_{K/2}^1 X_0 \\ \vdots \\ H_{K-1}^1 X_{K/2-1} \end{bmatrix} + \begin{bmatrix} N_0 \\ \vdots \\ N_{K/2-1} \\ N_{K/2} \\ \vdots \\ N_{K-1} \end{bmatrix} \quad \text{[Equation 2]}$$

Here, $Y_k$ denotes a reception value at a $k^{th}$ subcarrier of a frequency domain stream, $H_k^i$ denotes a frequency response of a $k^{th}$ subcarrier of an $i^{th}$ transmit antenna, and $X_k$ denotes a frequency domain signal of a transmission side. Specifically, $X_k$ denotes a $k^{th}$ symbol among outputs of the DFT spreader 110 of FIG. 1 or the DFT spreader 410 of FIG. 4. $N_k$ denotes a frequency domain noise in the $k^{th}$ subcarrier. It can be known that a received signal may be expressed by the above Equation 2 due to a predetermined transmission structure of the transmission apparatus. Equation 2 may also be divided into various equations as given by the following Equation 3:

$$\begin{bmatrix} Y_m \\ Y_{m+K/2} \end{bmatrix} = \begin{bmatrix} H_m^0 & 0 \\ 0 & H_{m+K/2}^0 \end{bmatrix} \begin{bmatrix} X_m \\ X_{m+K/2} \end{bmatrix} + \begin{bmatrix} H_m^1 & 0 \\ 0 & H_{m+K/2}^1 \end{bmatrix} \begin{bmatrix} X_{m+K/2} \\ X_m \end{bmatrix} + \begin{bmatrix} N_m \\ N_{m+K/2} \end{bmatrix}$$

$$= \begin{bmatrix} H_m^0 & H_m^1 \\ H_{m+K/2}^1 & H_{m+K/2}^0 \end{bmatrix} \begin{bmatrix} X_m \\ X_{m+K/2} \end{bmatrix} + \begin{bmatrix} N_m \\ N_{m+K/2} \end{bmatrix}, 0 \leq m \leq \frac{K}{2} - 1$$

[Equation 3]

Specifically, as expressed by the above Equation 3, the equalizer 540 may restore a transmission signal from M frequency domain received signals, using a minimum mean square error (MMSE) scheme or a zero forcing scheme, with respect to a transmit diversity transmission scheme by a cyclic subcarrier shift disclosed in the present invention.

According to an embodiment of the present invention, each of frequency domain streams received by the receiver 510 may include a plurality of frequency domain symbols. In this case, frequency domain streams simultaneously equalized by the frequency domain equalizer 520 may be spaced apart from each other by a value that is obtained by dividing a transformed magnitude of the IDFT despreader 530 by a number of transmit antennas.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The invention claimed is:

1. A transmission apparatus comprising:
   a discrete Fourier transform (DFT) spreader to perform a DFT for a modulated symbol to generate frequency domain symbols;
   a resource mapper to map the frequency domain symbols and a plurality of frequency domain streams;
   a cyclic shift unit to perform a cyclic shift for each of the mapped frequency domain streams according to a cyclic shift value that is determined with respect to each of the frequency domain streams; and
   a transmitter to perform an inverse DFT (IDFT) for the cyclic shifted frequency domain streams to generate a plurality of time domain streams, and to transmit the time domain streams to a reception apparatus using a transmit antenna corresponding to each of the time domain streams.

2. The transmission apparatus of claim 1, wherein the cyclic shift values with respect to the frequency domain streams are different from each other.

3. The transmission apparatus of claim 1, wherein the cyclic shift unit individually determines the cyclic shift value according to each of the frequency domain streams, based on a number of transmit antennas, a transform size of the DFT spreader, or a number of assigned subcarriers.

4. The transmission apparatus of claim 3, wherein the cyclic shift unit determines, as the cyclic shift value, an integer fold increase of a value that is obtained by dividing the transform size of the DFT spreader by the number of transmit antennas.

5. The transmission apparatus of claim 1, wherein the modulated symbol is modulated according to a phase shift keying (PSK) scheme or a quadratic amplitude modulation (QAM) scheme.

6. The transmission apparatus of claim 1, wherein:
   the transmitter inserts a cyclic prefix (CP) signal into each of the time domain streams, transmits the time domain streams with the inserted CP signal to the reception apparatus, and
   the reception apparatus receives the time domain streams using the CP signal.

7. A transmission apparatus comprising:
   a DFT spreader to perform a DFT for a modulated symbol to generate frequency domain symbols;
   a resource mapper to map the frequency domain symbols and a plurality of frequency domain streams;
   an IDFT despreader to perform an IDFT for the frequency domain streams to generate a plurality of time domain streams;
   a phase shift unit to perform a phase shift for each of the time domain streams according to a phase shift value that is determined with respect to each of the time domain streams; and
   a transmitter to transmit the phase-shifted time domain stream to a reception apparatus using a transmit antenna corresponding to each of the time domain streams.

8. The transmission apparatus of claim 7, wherein the phase shift values with respect to the time domain streams are different from each other.

9. The transmission apparatus of claim 7, wherein the phase shift unit individually determines the phase shift value according to each of the time domain streams, based on a number of transmit antennas.

10. The transmission apparatus of claim 7, wherein the phase shift unit determines, as the phase shift value with respect to each of the time domain streams, an integer fold increase of an inverse number of a number of transmit antennas.

11. The transmission apparatus of claim 7, wherein:
    the transmitter inserts a CP signal into each of the time domain streams, and
    the transmitter transmits the time domain streams with the inserted CP signal to the reception apparatus.

12. A reception apparatus comprising:
    a receiver to receive, from a transmission apparatus, a plurality of time domain streams that are cyclic shifted according to different cyclic shift values, and to perform a DFT for the time domain streams to generate frequency domain streams corresponding to the time domain streams;
    a frequency domain equalizer to equalize the frequency domain streams; and
    an IDFT despreader to perform an IDFT for the equalized frequency domain streams to generate a time domain symbol.

13. The reception apparatus of claim 12, further comprising:
    a demodulator to demodulate the time domain symbol;
    a descrambler to describe the demodulated time domain symbol; and
    a channel decoder to perform a channel decoding for the descrambled time domain symbol.

14. The reception apparatus of claim 12, wherein:
the transmission apparatus transmits the time domain streams using a plurality of transmit antennas,
the receiver receives the time domain stream using the same number of subcarriers as a number of antennas as a number of the transmit antennas, and
the frequency domain equalizer simultaneously equalizes the frequency domain streams.

15. The reception apparatus of claim 14, wherein:
each of the frequency domain streams includes a plurality of frequency domain symbols, and
the frequency domain symbols simultaneously equalized by the frequency domain equalizer are spaced apart from each other by a value that is obtained by dividing a transformed magnitude of the IDFT despreader by a number of transmit antennas.

* * * * *